Oct. 16, 1928.

M. A. MARQUETTE 1,687,945

TIRE BUILDING

Filed May 8, 1925

INVENTOR.
Melvon A. Marquette
BY
Edward C. Taylor
ATTORNEY.

Patented Oct. 16, 1928.

1,687,945

UNITED STATES PATENT OFFICE.

MELVON ANDREW MARQUETTE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

TIRE BUILDING.

Application filed May 8, 1925. Serial No. 28,759.

This invention has for its object the economical building of automobile tire casings of superior quality, and relates particularly to a building method in which the several plies of fabric or other strain-resisting material are automatically, without especial attention on the part of the tire builder, subjected to tension conditions which will enable them to bear equally the strain which they must stand in use. It has long been recognized that the inner ply of a tire is most subject to breakage in use, the so-called fabric breaks starting invariably from the inside surface of the tire. Various ways have been suggested by which this difficulty might be overcome, but none of them, so far as I am aware, have attained with economy the result desired.

My invention will now be described with reference to the drawings, in which

In building a tire casing according to my invention a building former is employed having characteristics different from those of formers generally in use. Whereas the usual metal formers, or inflated bags upon which tires have been built, are of a fixed size during the building process, the former used in the practice of my invention varies in diameter during the application of successive plies. In the style preferred, the former is an annular rubber bag of sufficient thickness to permit the building of a tire upon it without being inflated, and yet of insufficient rigidity to preclude all yielding of the bag.

Figure 1:
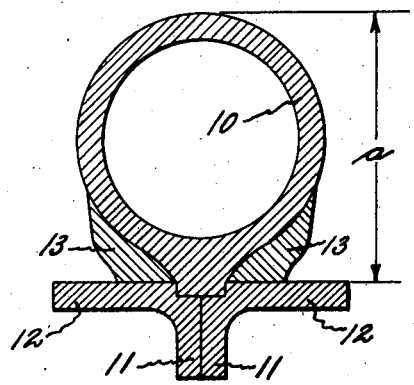
Fig. 1 is a detail section of a building former upon which a tire is built according to my improved method.

The bag 10, ready for the start of the tire building operation, is shown in Fig. 1. It is supported upon a holding ring 11, preferably split and provided with ledges 12 which assist in accurately locating the bead reinforcements. Between these ledges and the sides of the bag are flexible rings 13, which hold the sides of the tire away from the bag during building but which are removed during vulcanization. With no fabric in place, the height from the ledges to the crest of the bag may be represented by $a$.

Figure 2:
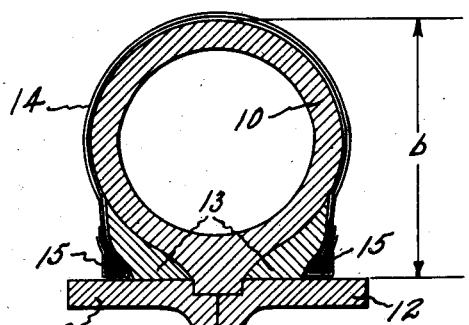
Fig. 2 is a similar view, showing the application of the first ply of fabric.

In Fig. 2 the bag has been shown with the initial ply 14 of fabric in place. While referring to this as "fabric" for convenience, it will be understood that the usual unwoven cord fabric, composed of parallel cords embedded in a matrix sheet of rubber, may be used, this material being preferred for building cord tires. The fabric is applied to the core by stretching it in endless band form, preferably consisting of two adhering plies, from an initial circumference of about that of the beads of the tire, so that it will, when promptly placed around the crest of the bag, shrink down the sides and hug the bag closely, due to the elasticity of the rubber component of the band. Shaping of the sides of the band to the bag, where this has not been accomplished automatically by the shrinking, may be accomplished in any suitable way known in the art.

As the band shrinks on the bag the tension of its middle portion will draw down the crest of the bag somewhat, the bag being slightly bulged sideways and its tread portion slightly compressed. The distance between the crest of the bag and the outer surface of the bead ring ledges is indicated by $b$ in Fig. 2, which as will be apparent is less than the distance $a$ previously referred to.

Figure 3:
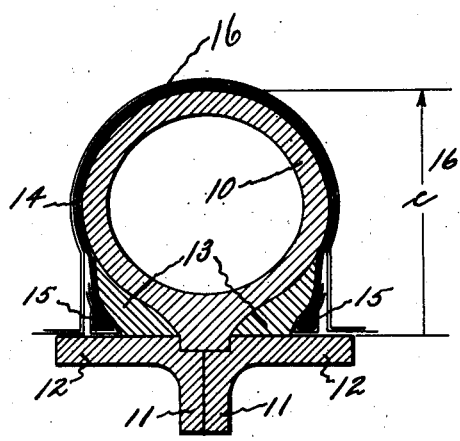
Fig. 3 is a similar view, showing the application of a succeeding ply.

In making a four-ply tire the beads 15 may now be applied, and the edges of the first fabric layer turned up around them. A second fabric layer 16 of two plies is now applied by stretching over the crest of the bag in the same way as was done with the first layer. This second layer exerts an additional contractive force upon the crest of the bag and causes a still greater bulging of the sides and compression of the outer circumferential portion. The distance $c$ between the bead ledges and the crest of the bag after the application of the second fabric layer is shown in Fig. 3, being less than distance $b$ of Fig. 2

Figure 4:
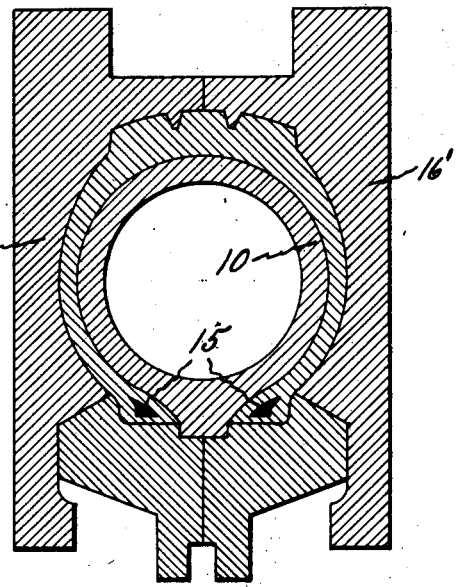
Fig. 4 is a section showing the method of vulcanization.

During the sagging of the bag due to the application of the second layer, the side portions of the first layer, which is now fixed as to its inner circumference by anchorage to the beads 15, will be slacked off and the tension on the component elements of the fabric band reduced or removed. If the second layer is drawn tightly down the sides of the bag and anchored by folding around the beads while the bag is thus flattened or, so to speak, partially contracted, it will be plain that its elements are more taut than the elements of the first layer. After covering the tire carcass as usual with the tread and sidewall rubber, the flexible rings 13 are removed, and the tire vulcanized while stretched out into a rigid mold 16' (Fig. 4) by fluid pressure exerted through the annular bag 10. The bag is thus forced up to its original size shown in Fig. 1 and tensions the tire material. Since the first layer of fabric was slacked off by the placing of the second layer, it will be stretched during vulcanization a lesser amount than the second layer. As above pointed out, this condition is to be desired because of the greater tendency to fabric breakage in the inner plies of the tire. The decrease in fabric breakage when the present method is followed, deduced on theoretical grounds, has proved to be an actuality in a large production of tires by this method. While the description has been of the making of a tire of four plies, two to a layer, the method is applicable to tires of other types.

Having thus described my invention, I claim:

1. A method of making tires which comprises stretching successive layers of material in band form over a yieldable former, carrying the successive layers down the sides of the former in a plane substantially tangent to the widest part of the former, anchoring the sides of each layer to the bead diameter and in said plane before applying the next layer, and expanding the tire during vulcanization to tension the material, whereby a lesser tension is imparted to the inner layers of material than to the outer layers.

2. A method of making tires which comprises stretching a layer of material in band form over an uninflated flexible annular bag of tire form and having removable rings adapted to build out its lower side portions to substantially the width of the widest part of the bag, anchoring the side portions of the material to the bead diameter of the tire, stretching a second band of material over the bag and the first band thereon, whereby the external major circumference of the bag is reduced by the contractive tension of the material so stretched into place and the side portions of the first-applied band slackened in tension, anchoring the second band to the bead diameter, removing the removable rings, and vulcanizing the tire in a mold of tire form into which the tire is stretched by internal expansive pressure applied through the bag, whereby a lesser tension is imparted to the inner layers of material than to the outer layers.

3. A method of making tires which comprises curving a layer of tire building material into the shape of an arch having substantially parallel sides, anchoring the edges of the layer in a fixed circumference, lowering the crest of the arch while preserving the spacing of the edges to slacken the side portions of the material, shaping a second layer of tire building material into similar arch form overlying the first and anchoring its edge portions in a fixed circumference, shaping the multi-ply tire into horse-shoe cross-section, and vulcanizing the tire under tension, whereby undue strain on those plies laying on the inside of the tire is avoided.

MELVON ANDREW MARQUETTE.